(12) United States Patent
Emamjomeh et al.

(10) Patent No.: US 8,465,118 B2
(45) Date of Patent: Jun. 18, 2013

(54) PRINTING SYSTEM

(75) Inventors: Ali Emamjomeh, San Diego, CA (US); George Sarkisian, San Diego, CA (US); Blair A. Butler, San Diego, CA (US); Elizabeth Ann Visnyak, San Diego, CA (US); Sean W. Dobbins, San Diego, CA (US); David S. Vejtasa, Rancho Bernardo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 268 days.

(21) Appl. No.: 12/815,386

(22) Filed: Jun. 14, 2010

(65) Prior Publication Data

US 2011/0304661 A1    Dec. 15, 2011

(51) Int. Cl.
*B41J 2/01*            (2006.01)

(52) U.S. Cl.
USPC ............. 347/16; 347/14; 347/96; 347/100

(58) Field of Classification Search
USPC ........... 347/14–16, 95–101, 21, 28; 523/160, 523/161; 106/31.13, 31.27, 31.6
See application file for complete search history.

(56) References Cited

U.S. PATENT DOCUMENTS

| | | | |
|---|---|---|---|
| 7,157,504 B2 | 1/2007 | Ma et al. | |
| 7,246,896 B2 | 7/2007 | Askeland et al. | |
| 7,530,684 B2 * | 5/2009 | Yamanobe | 347/96 |
| 7,708,368 B2 * | 5/2010 | Kachi | 347/19 |
| 7,914,108 B2 * | 3/2011 | Konno et al. | 347/21 |
| 7,934,785 B2 * | 5/2011 | Lang | 347/7 |
| 8,147,020 B2 * | 4/2012 | Kariya | 347/14 |
| 8,215,744 B2 * | 7/2012 | Yamanobe | 347/21 |
| 8,220,913 B2 * | 7/2012 | Ooishi et al. | 347/101 |
| 2002/0101500 A1 * | 8/2002 | Wagner et al. | 347/213 |
| 2003/0142343 A1 * | 7/2003 | Bezenek | 358/1.15 |
| 2005/0274281 A1 | 12/2005 | Jackson | |
| 2006/0098068 A1 * | 5/2006 | Hakamada et al. | 347/100 |
| 2006/0125895 A1 * | 6/2006 | Nito et al. | 347/100 |
| 2006/0158494 A1 * | 7/2006 | Yamanobe | 347/96 |
| 2007/0040879 A1 * | 2/2007 | Chung et al. | 347/96 |
| 2007/0216742 A1 | 9/2007 | Sarkisian et al. | |
| 2007/0225401 A1 | 9/2007 | Sarkisian et al. | |
| 2009/0234067 A1 | 9/2009 | Kariya | |
| 2009/0293209 A1 * | 12/2009 | Chung et al. | 8/445 |
| 2010/0053236 A1 | 3/2010 | Ooishi et al. | |
| 2010/0079524 A1 * | 4/2010 | Saita et al. | 347/14 |

OTHER PUBLICATIONS

International Search Report and Written Opinion for PCT/US2010/038562 dated Mar. 31, 2011.

* cited by examiner

*Primary Examiner* — Matthew Luu
*Assistant Examiner* — Rut Patel

(57) ABSTRACT

A printing system and method form one or more pretreatment compositions on a medium. The one or more pretreatment compositions are selected based upon a parameter of the medium.

17 Claims, 2 Drawing Sheets

PRINTING SYSTEM

CROSS-REFERENCE TO RELATED PATENT APPLICATIONS

The present application is related to co-pending PCT Patent Application Serial No. PCT/US2010/038562 filed on the same day as the present application by the same inventors and entitled PRE-TREATMENT COMPOSITION, the full disclosure of which is hereby incorporated by reference.

BACKGROUND

Some printing systems print images using fluid or ink. Achieving acceptable image quality and durability is sometimes difficult.

DETAILED DESCRIPTION OF THE EXAMPLE EMBODIMENTS

Figure 1:
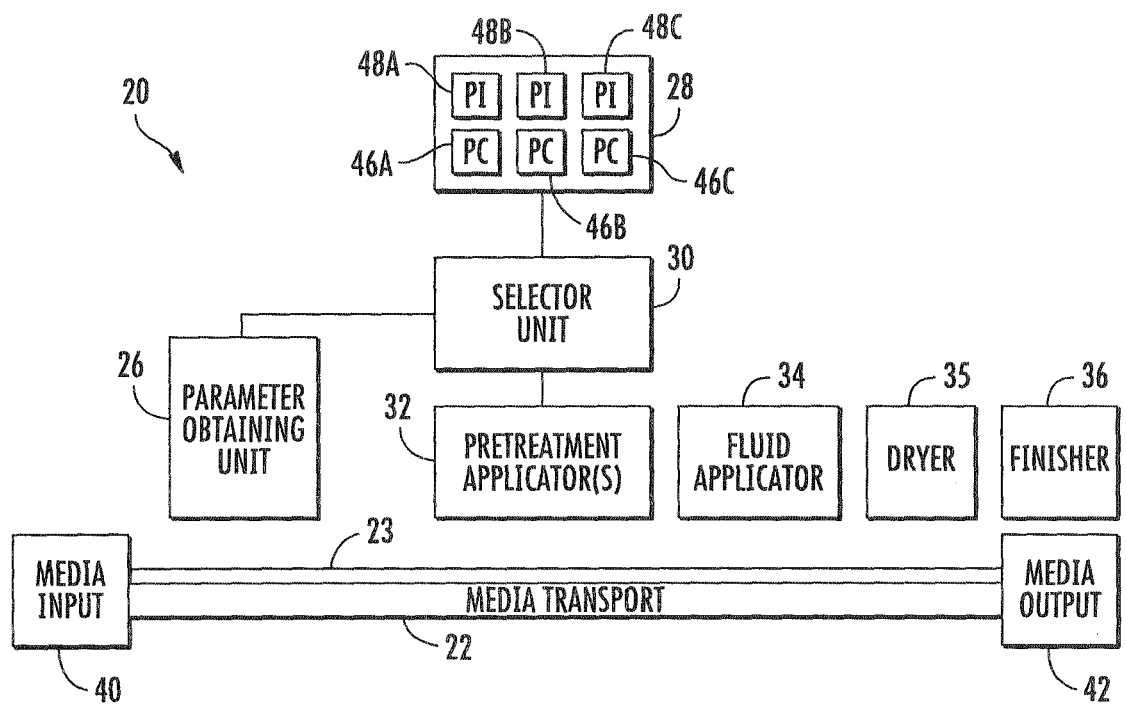
FIG. 1 is a schematic illustration of a printing system according to an example embodiment.

FIG. 1 schematically illustrates printing system 20 according to an example embodiment. As will be described hereafter, printing system 20 applies one or more pretreatment compositions onto a medium prior to the application of a fluid. Application of the pretreatment composition is varied based upon at least one parameter of the medium being printed upon. As a result, image quality and durability may be enhanced.

Printing system 20 comprises media transport 22, parameter obtaining unit 26, pretreatment supply 28, selector unit 30, pretreatment applicator 32, fluid applicator 34, post print dryer 35 and finisher 36. Media transport 22 comprises a mechanism configured to transport or move a medium 23 relative to and between at least pretreatment applicator 32, fluid applicator 34 and finisher 36. Media transport 22 includes a media input 40 and a media output 42. Media transport 22 moves media between input and output. In one embodiment, media transport 22 may be configured to move a medium in the form of a web, wherein the media input 40 and the media output 42 may comprise supply and take up rolls. In another embodiment, media transport 22 may be configured to move a medium in the form of individual sheets. Media transport 22 may comprise rollers, belts, conveyors or other structures to drive and move the medium.

According to one embodiment, media transport 22 is configured to transport media from pretreatment applicator 32 to fluid applicator 34 at a rate such that one of more pretreatment compositions applied to the medium at pretreatment applicator 32 are substantially moist or wet at the time at which fluid from applicator 34 is applied onto the one or more pretreatment compositions. For purposes of this disclosure, the term "wet" encompasses liquids in a gel state. In the example illustrated, media transport 22 is configured to transport a medium from pretreatment applicator 32 to fluid applicator 34 in under one second. In other embodiments, media transport 22 may have other configurations and may operate at other speeds.

Parameter obtaining unit 26 comprises one or more device configured to obtain one or more parameters of the medium to be printed upon. Such parameters obtained by unit 26 may include physical characteristics of the medium or may include an identity or a name associated with the medium. Examples of parameters comprising physical characteristics of the medium which are obtained by unit 26 include, but are not limited to, a gloss or reflectivity of the medium, an absorptivity of the media and a media type, such as whether the medium is a coated media or an uncoated media. In the example illustrated, parameter obtaining unit 26 is configured to obtain such parameters using one or more of several different manners. For example, parameter obtaining unit 26 may include a first sensor for sensing physical characteristics (such as gloss/reflectivity, absorptivity or media type) of the media to be printed upon.

Parameter obtaining unit 26 may include a second sensor for sensing or determining an identity or name of the media to be printed upon. For example, the medium may include one or more identifying indicia, such as a barcode or identifying marks on the face of the medium or along edges of a stack or roll, wherein the barcode or marks are read by a sensor to identify the medium. In one embodiment, the name of the media is passed directly to selector unit 30 to be used in selecting or choosing a pretreatment composition. In another embodiment, parameter obtaining unit 26, upon sensing or detecting the name of the medium to be printed upon, consults a database or lookup table including physical characteristics associated with the identity of the media and then passes the physical characteristic to the selector unit 30 for use in choosing a pretreatment composition.

In addition to employing a sensor to either directly sense or detect parameters of the media, parameter obtaining unit 26 may utilize an input, such as a display in conjunction with a keyboard, mouse, microphone or other input device, to receive parameters which are requested from a person by the display. The requested and input parameters may comprise a physical characteristic of the medium or an identity or name of the medium. In circumstances where a person is requested to enter an identity or name of the medium being printed upon, parameter obtaining unit 26 may either transmit the name of the media directly to selector unit 30 to be used in selecting or choosing a pretreatment composition or, upon receiving the name of the medium to be printed upon, consult a database or lookup table including physical characteristics associated with the identity of the media and then transmit the physical characteristic to the selector unit 30 for use in choosing a pretreatment composition. In other embodiments, parameter obtaining unit 26 may obtain fewer additional parameters and may obtain such parameters in other manners. For example, parameter obtaining unit may also obtain such parameters from a job ticket sensed, read or electronically received by unit 26.

Pretreatment supply 28 comprises a supply of more than one pretreatment composition and/or more than one pretreatment ingredient available for selection by selector unit 30 for supplying to pretreatment applicator 32. In the example illustrated, pretreatment supply 28 includes three different pretreatment compositions 46A, 46B and 46C (collectively referred with pretreatment compositions 46). In one embodiment, each of pretreatment compositions 46 includes between 1% and 20% by weight of a fixing agent, such as a polyvalent salt, and between 1 and 70% by weight of a resin, such as latex. In one embodiment, each of pretreatment compositions 46 has a different concentration or percentage of a fixing agent such as a polyvalent metal salt. In one embodiment, each of pretreatment compositions 46 has a different concentration or percentage of a latex resin including latex particles. In one embodiment, each of pretreatment compositions may have a different concentration or percentage of a matte additive which reduces the reflectivity or gloss of the final printed image. In one embodiment, each of pretreatment compositions may include other materials such as optical brighteners, pigments or dyes that change the background color of the printed sheet. In yet other embodiments, pretreatment compositions 46 may have different concentrations of other ingredients or may include different ingredients altogether. In one embodiment, pretreatment compositions 46A, 46B and 46C comprise different pretreatment compositions configured to be applied to coated or uncoated print media having a gloss, semi-gloss and matte finish, respectively. Although supply 28 is illustrated as including three different pretreatment compositions 46, in other embodiments, supply 28 may include a greater or fewer of such different pretreatment compositions 46.

As shown by FIG. 1, pretreatment supply 28 additionally includes pretreatment composition ingredients 48A, 48B and 48C (collectively referred to as pretreatment ingredients 48). Pretreatment ingredients 48 each comprise a portion of a final pretreatment composition to be applied by pretreatment applicator 32. Each pretreatment ingredients 48 includes one or more components or ingredients which, when mixed with other ingredients, forms the final pretreatment composition that is applied by pretreatment applicator 32. For example, in one embodiment, pretreatment ingredient 48A may comprise a liquid vehicle including multiple components or a single component which form the vehicle, pretreatment ingredient 48B may comprise a fixing agent, such as one of more polyvalent metal salts, and pretreatment ingredient 48C may comprise one of more latex resins. In one embodiment, pretreatment ingredient 48A may comprise a liquid carrier and a fixing agent, pretreatment ingredient 48B may comprise a latex resin and pretreatment ingredient 48C may comprise a matte additive which reduces the reflectivity or gloss of an image printed upon the final pretreatment composition. Ingredients 48 allow unit 30 to vary the mixture of such ingredients to vary the final pretreatment composition that is applied by pretreatment applicator 32. In one embodiment, or more ingredients 48 may be added to the pre-mixed or pre-prepared pretreatment compositions 46 to vary the composition of the final pretreatment composition applied by pretreatment applicator 32. Although supply 28 is illustrated as including three different pretreatment ingredients, in other embodiment, supply 28 may include a greater or fewer of such pretreatment composition ingredients. In some embodiments, supply 28 may omit ingredients 48 or may alternatively omit the pre-mixed or pre-prepared compositions 46.

In one embodiment, supply 28 comprises a dock including multiple bays, each bay configured to removably receive a cartridge or container containing one of pretreatment compositions 46 or one of ingredients 48. In other embodiment, supply 28 may include multiple chambers, each chamber configured to receive a pretreatment composition 46 which is poured into the chamber or an ingredient which is poured into the chamber. In other embodiments, supply 28 may have other configurations. For example, in some embodiments, supply 28 may include means for mixing or agitating the pretreatment compositions or ingredients.

Selector unit 30 comprises a mechanism configured to select or identify a final pretreatment composition to be applied to or formed upon the media by pretreatment applicator 32 based at least in part upon one or more parameters obtained by unit 26. Once the selection is made, selector unit 30 facilitates preparation of the final pretreatment composition (where ingredients 48 are used) and supplies the final mixed or pre-prepared pretreatment composition to pretreatment applicator 32 for application to the medium. In another embodiment, once the final pretreatment composition is determined, selector unit 30 causes the ingredients to be separately deposited by applicator 32 onto medium 23 (either sequentially or concurrently) such that the different ingredients 48 mix or react on the media 23 to form the final pretreatment composition. In one embodiment, selector unit 30 comprises one or more processing units, one or more valves or flow control mechanisms and one or more actuators configured to selectively actuate the one or more valves or flow control mechanisms in response to control signals from the one or more processing units.

According to one embodiment, in response to receiving data indicating that the print medium has a higher level of reflectivity or gloss, selector unit 30 may select a pretreatment composition from the pre-prepared pretreatment compositions 46 or a final pretreatment composition to be prepared or mixed from ingredients 48 or from ingredients 48 and compositions 46, wherein the final pretreatment composition has little or no matte additive. In response to receiving data from unit 26 indicating that the print medium is uncoated or has a relatively small degree or amount of coating (indicating a greater pretreatment composition liquid carrier absorptivity), selector unit 30 may choose a pretreatment composition having a smaller quantity of fixer (polyvalent salt). Likewise, in response to receiving data from unit 26 indicating that the print medium is coated or has a relatively large degree or amount of coating (indicating a lesser pretreatment composition liquid carrier absorptivity), selector unit 30 may choose a pretreatment composition having a greater quantity or percentage of fixer (polyvalent salt). For example, when the medium to be printed upon comprises a coated offset media, selector unit 30 may choose a pretreatment composition having a concentration of between 1% and 20% and nominally at least about 10%, of a polyvalent salt such as calcium chloride and may cause applicator 32 to apply to pretreatment composition at a rate of between 0.1 to 20 g per square meter For uncoated media, selector unit 30 may cause applicator 32 to apply the same pretreatment composition at a lesser rate.

In one embodiment, selector unit 30 may base its selection of a final pretreatment composition to be applied by pretreatment applicator 32 upon parameters other than parameters of the media being printed upon. For example, in one embodiment, selector unit 30 may further base its selection of the final pretreatment composition on a desired durability of the image to be formed on the medium. In embodiments where a person or user indicates a need for a greater degree of durability for the image, selector unit 30 may choose a final pretreatment composition having a greater concentration or amount of a latex resin. Alternatively, where a person or user indicates a need for a lesser degree of durability or where other provisions are made for providing durability (such as with an overcoat layer provided by finisher 36), selector unit 30 may choose a final pretreatment composition having a lesser concentration or amount of a latex resin. In place of a person indicating a desired durability level, the person may input the purpose of the printed media or the existence or other characteristics of any finishing or overcoat layers to be applied after formation of the image.

Pretreatment applicator 32 comprises a mechanism configured to apply the final pretreatment composition chosen by selector unit 30 to the medium being carried by media transport 22. The pretreatment applicator 32 receives the chosen final pretreatment composition from selector unit 30. In one embodiment, pretreatment applicator 32 comprises a roller or roll coater. Because a roller or roll applicator is utilized to apply to pretreatment composition, the liquid carrier or water going on to the medium is reduced, enhancing properties of the medium and its media path. In one embodiment, the roll coater is configured to apply a final pretreatment composition having a concentration of between about 1% and about 20% by weight, nominally at least 10% by weight, of a fixer such as a polyvalent metal salt such as calcium chloride, covering the medium in a range of 0.1 to 20 g per square meter and nominally up to 2 g per square meter. In other embodiments, the roll coater of pretreatment applicator 32 may be configured to apply the final pretreatment composition chosen by selector unit 30 at other rates.

In other embodiments, pretreatment applicator 32 may comprise other mechanisms or devices configured to apply the pretreatment composition chosen by selector unit 30 to the medium carried by media transport 22. Examples of other forms of pretreatment applicator 32 include an air doctor coater, a blade coater, a rod coater, a knife coater, a squeeze coater, an impregnation coater, a reverse roll coater, a transfer roll coater, a gravure coater, a kiss-roll coater, a cast coater, a spray coater, a curtain coater, an inkjet device, and an extrusion coater. Details of the method may be referenced in "Coating Kogaku (Coating Engineering)", by Yuji Harasaki. In some examples, the coater is a transfer roll coating device. In order to apply the pre-treatment composition to the recording medium with a uniform thickness, an air-knife may be used for the coating or a member having an acute angle may be positioned with a gap corresponding to the predetermined amount of pre-treatment composition, between the member and the recording medium.

In some other examples, the application of the pre-treatment composition may be done by any known commercial methods such as gravure, inkjet method, spray coating method, and roller coating method. In some example, the pre-treatment composition is applied by a coating method using rollers. Thus, as an example, the pre-treatment composition is rolled on recording medium using commercial roll coating equipment. Exemplary method for printing durable inkjet ink images onto a recording medium includes thus applying the pre-treatment composition onto the recording medium with rollers or transfer roll coating devices. In some examples, a set of more than 3 rollers can be used. In some other examples, the printing method uses about up to 30 rollers.

As an example, within such method, the pre-treatment composition is received onto a first surface, and then a contact is formed between the first surface and a transfer roll. The pre-treatment composition is then transferred from the first surface to the transfer roll. Finally, the pre-treatment composition is transferred from the transfer roller to a print medium. In one approach, the pre-treatment composition is applied to a print recording medium just before the printing of inks by pens. According to this method, one or several rollers receive the pre-treatment composition and transfer it to a print medium.

In addition to applying a final pretreatment composition chosen by selector unit 30, pretreatment applicator 32 may be configured to apply the final pretreatment composition at different rates as directed by selector unit 30. In particular, based upon the parameters of the medium being printed upon receipt from unit 26, selector unit 30 may generate control signals that direct or cause pretreatment applicator 32 to apply the final chosen pretreatment composition at different rates. For example, in certain applications, selector unit 30 may cause pretreatment applicator 32 to apply a heavier or lighter coating weight to the medium depending upon the parameters of the medium being printed upon.

Fluid applicator 34 comprises a mechanism configured to apply fluid onto the medium after the final pretreatment composition has been applied to the medium by pretreatment applicator 32. In one embodiment, fluid applicator 34 comprises ink-jet devices configured to supply one or more colors of ink including colorants based on pigments, dyes, a combination of both, metal particles along with colorants for machine readability (MICR), etc., to the medium and on top of the previous applied pre-treatment composition while the pretreatment composition is wet to form an image. Because the colorants are applied while the pretreatment composition is wet, the colorants become encapsulated and completely surrounded or embedded in the pretreatment composition. As the liquid vehicle of the pretreatment composition is subsequently absorbed into the medium and/or evaporated, the latex particles form a film which covers the encapsulated colorants to form a durable image on the medium. As used herein, "image" refers to marks, signs, symbols, figures, indications, and/or appearances deposited upon a material or substrate with either visible or an invisible ink composition. Examples of an image can include characters, words, numbers, alpha-numeric symbols, punctuation, text, lines, underlines, highlights, and the like. In one embodiment, fluid temperature 34 applies fluid, such as one more inks, to the medium in a range of 50 to 2000 ft./m. In other embodiments, fluid applicator 34 may comprise other mechanisms configured to apply ink or non-image forming fluids.

As shown by FIG. 1, printing system 20 omits print zone dryers, i.e., devices that dry fluid on medium 23 and substantially opposite to fluid applicator 34. The omission of print zone dryers is facilitated by the inclusion of fixing agents in the pretreatment composition. In particular, the final pretreatment composition chosen by selector unit 30 and applied by pretreatment applicator 32 fixes a colorant and controls bleeding without driving off carrier fluid between color planes applied by fluid applicator 34. In other embodiments, printing system 20 may include print zone dryers or other dryers.

Post print dryer 35 comprises one or more dryers configured to dry previously applied fluids on the print medium after the medium has moved out of any print zone opposite to fluid applicator 34. Such drying drives off, volatizes or evaporates the liquid vehicle, such as water and/or solvents. Such drying may be achieved by the application of heat, microwaves, convection and other drying mechanisms. In some embodiments, post print dryer 35 may be omitted.

Finisher 36 comprises a mechanism configured to apply an overcoat or finishing coat over the one more color planes or other fluids applied by fluid applicator 34 and over the previously applied to pretreatment composition applied by applicator 32. In one embodiment, finisher 36 may be configured to apply an anionic latex to enhance durability. In other embodiments, finisher 36 may be omitted.

Figure 2:
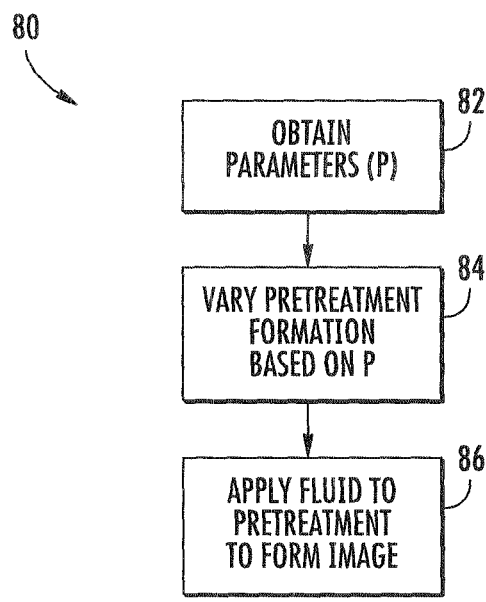
FIG. 2 is a flow diagram of a method of printing according to an example embodiment.

FIG. 2 is a flow diagram of a printing process 80 that may be employed by printing system 20. As indicated by step 82, parameter obtaining unit 26 obtains parameters (P) of the medium to be printed upon. As noted above, such parameters may be obtained by one of multiple methods. First, such parameters may be obtained by one or more sensors that either directly sense a parameter of the medium such as a physical characteristic of the medium or a name or identity of the medium. In embodiments where selector unit 30 utilizes a physical characteristic of the medium in choosing a pretreatment composition for application by applicator 32, unit 26 (or unit 30) may consult a lookup table, database or other memory to identify a corresponding physical characteristic associated with the name or identity of the particular media being printed upon. In some embodiments, the detected identity or name associated with the medium itself may be directly used by selector unit 30 to choose one or more final pretreatment compositions.

As indicated by step 84, selector unit 30 varies the formation of pretreatment based upon the one of more parameters obtained in step 82. In one embodiment, selector unit 30 varies the pretreatment formation by choosing a selected one of several available pretreatment compositions 46, pretreatment ingredients 48 or mixtures thereof. In circumstances, selector 30 may additionally or alternatively vary the pretreatment formation by varying the density or coating weight of the final pretreatment composition formed upon the medium by generating control signals (from a processing unit) that vary the rate at which the final pretreatment composition is supplied to applicator 32 or the rate at which applicator 32 applies the pretreatment composition or pretreatment composition ingredients. Each of such adjustments, varying the final formed pretreatment composition or varying the density of the final formed pretreatment composition, is based at least in part upon the obtained parameter of the medium.

As indicated by step 86, once the pretreatment application or ingredients have been applied to the print medium, fluid applicator 34 applies fluid to the previously applied and formed pretreatment composition to form an image on the pretreatment composition and on the medium. In one embodiment, the fluid applied by fluid applicator 34 comprises one or more inks. In one embodiment, the fluid is applied by an inkjet print head or plurality of inkjet printheads. The fluid applied by fluid applicator 34 is applied while the pretreatment composition is still in a wet state upon the print media. In those embodiments in which the pretreatment composition includes a latex, absorption of the liquid carrier water by the print medium and evaporation of the liquid carrier water results in the latex forming a protective layer over the colorants or other particles of the fluid applied by fluid applicator 34 for enhanced durability. In such embodiments, print zone dryers may be omitted during application of fluid.

In the example illustrated, the fluid applied by applicator 34 in step 86 and the pretreatment composition applied by applicator 32 in step 84 each have the same charge polarity. In particular, pretreatment composition has an anionic latex polymer which captures the anionic ink colorant during film formation of the latex. As a result, little or no chemical reaction of the latex in the pretreatment composition with the ink colorants of the fluid applied by applicator 34 occurs. The film formation of the latex of the pretreatment composition occurs at well below room temperature (−22° C.) so once enough of water is removed from the pretreatment fluid or composition by evaporation, post-print drying or penetration into the medium, the latex particles begin to coalesce to form a continuous film. The resulting film traps the ink colorants to provide a very durable and water resistant print. In other embodiments, the final pretreatment composition applied to (formed upon) the medium and the fluid applied by applicator 34 may have different charge polarities.

In one embodiment, such latex film formation is initiated in response to at least 70% of the liquid vehicle originally in the pretreatment composition being absorbed by the medium or being evaporated. In such an embodiment, the fluid (ink colorants in one embodiment) is applied to the pretreatment composition while at least 30% of the liquid vehicle remains (prior to evaporation or absorption of 70% of the liquid vehicle). Although the colorants may alternatively be applied with less than 30% of the liquid vehicle remaining, a greater amount of film stratifications may result, potentially reducing the extent to which the colorants may become encapsulated and potentially reducing the durability of the final image.

In some embodiments, other film forming particles may be used, wherein the other film forming particles merge to form a film in response to different percentages of remaining liquid vehicle. For example, the onset of film formation may be adjusted by adjusting the film forming particles or adjusting the temperature of the pretreatment composition. In one embodiment, the latex particles have a glass transition temperature of −22 C so as to readily form a film at room temperature.

It is believed that after the pre-treatment composition is overprinted with the ink composition on the substrate or, in other words, when ink and pre-treatment composition meet on the recording medium surface, an effective crashing or immobilization of ink colorants is realized and nearly all the colorants are deposited on the surface of the media rather than penetrating the media and depositing below the surface. Concurrently, the pre-treatment composition vehicle, upon mixing with the ink vehicle, becomes highly wetting and the mixed vehicle quickly penetrates the media, leaving the colorants behind. Thus, in some embodiments, the pre-treatment composition, upon contact with ink, causes the colorants present in the ink formulation to precipitate out and result in the enhancement of image quality attributes, as for example, optical density, chroma, and durability. Within such printing method, the combination of pre-treatment composition and ink composition results in method that provide high quality and durable image prints. The use of the pre-treatment composition such as disclosed herein results in the enhancement of image quality attributes while enabling high-speed printing. Furthermore, the pre-treatment composition provides good image quality such as permanence and smudge resistance.

Figure 3:
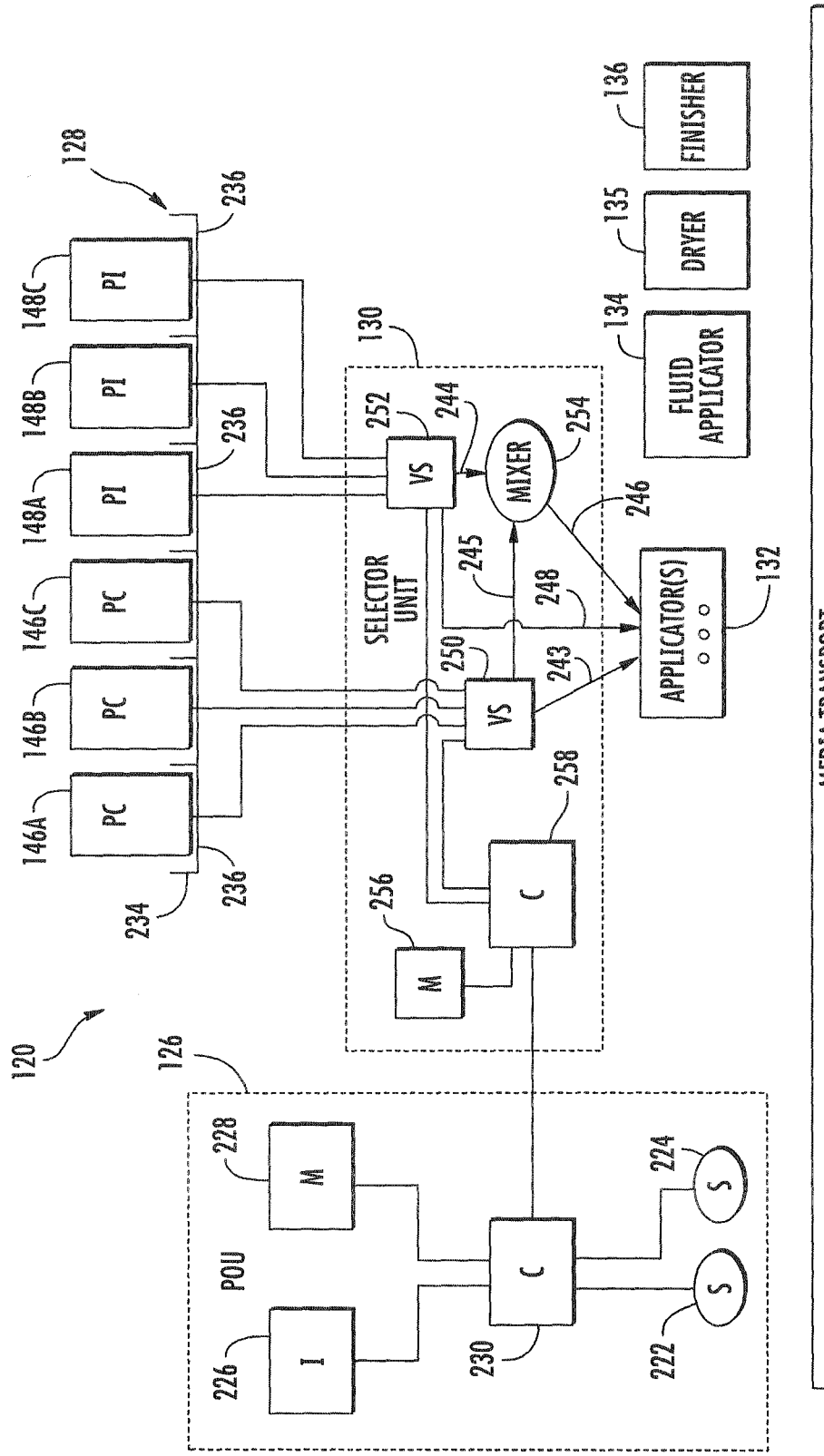
FIG. 3 is a schematic illustration of another embodiment of the printing system of FIG. 1 according to an example embodiment.

FIG. 3 schematically illustrates printing system 120, another embodiment of printing system 20. Like printing system 20, printing system 120 applies one or more pretreatment compositions onto a medium prior to the application of a fluid. Application of the pretreatment composition is varied based upon at least one parameter of the medium being printed upon. Printing system 120 comprises media transport 122, parameter obtaining unit 126, pretreatment supply 128, selector unit 130, pretreatment applicator 132, fluid applicator 134, post print dryer 135 and finisher 136. Media transport 122 comprises a mechanism configured to transport or move a medium relative to and between at least pretreatment applicator 132, fluid applicator 134 and finisher 136. In one embodiment, media transport 122 may be configured to move a medium in the form of a web between supply and take up rolls. In another embodiment, media transport 122 may be configured to move a medium in the form of individual sheets. Media transport 122 may comprise rollers, belts, conveyors or other structures to drive and move the medium.

In one embodiment, media transport is configured to transport the medium at a speed such that pretreatment composition is substantially wet at a time when fluid or colorant containing ink is applied onto the pretreatment composition by applicator 134. According to one embodiment, transport 122 moves the medium between applicator 132 and applicator 134 in under 10 seconds, and nominally under 5 seconds. In one embodiment, transport 122 moves the medium between applicator 132 and applicator 134 in under 1 second. In other embodiments, transport 122 may operate at other speeds depending upon the rate at which the pretreatment composition dries (the rate at which liquid vehicle evaporates or is absorbed) and film forming onset triggers associated with film forming particles of the pretreatment composition.

According to one embodiment, media transport 122 is configured to transport media from pretreatment applicator 132 to fluid applicator 134 at a rate such that one of more pretreatment compositions applied to the medium at pretreatment applicator 132 are substantially moist or wet at the time at which fluid from fluid applicator 134 is applied onto the one or more pretreatment compositions. In the example illustrated, media transport 122 is configured to transport a medium from pretreatment applicator 132 to fluid applicator 134 in under one second. In other embodiments, media transport 122 may have other configurations and may operate at other speeds.

Parameter obtaining unit 126 comprises one or more devices configured to obtain one or more parameters of the medium to be printed upon. Such parameters obtained by unit 126 may include physical characteristics of the medium or may include an identity or a name associated with the medium. Examples of parameters comprising physical characteristics of the medium which are obtained by unit 126 include, but are not limited to, a gloss or reflectivity of the medium, an absorptivity of the media and a media type, such as whether the medium is a coated media or an uncoated media. In the example illustrated, parameter obtaining unit 126 is configured to obtain such parameters using one or more of several different manners. In the example illustrated, parameter obtaining unit 126 includes sensors 222, 224, input 226, memory 228 and controller 230. Center 222 comprises one or more sensors configured to sense or detect a physical characteristics (such as gloss/reflectivity, absorptivity or media type) of the media to be printed upon.

Sensor 224 comprises one or more sensors configured sense or determine an identity or name of the media to be printed upon. For example, the medium may include one or more identifying indicia, such as a barcode or identifying marks on the face of the medium or along edges of a stack or roll, wherein the barcode or marks are read by sensor 224 to identify the medium. In one embodiment, a single sensor may be employed to sensor detect either or both of their physical characteristic or a name associate with the media being printed upon.

Input 226 comprises a device configured to request the input and to receive input from a person, the input constituting at least one parameter associated with the medium. In one embodiment, input 226 may include a display for presenting a graphical user interface or prompt by which a person may input or select a parameter of the medium to be printed upon. For example, input 226 may be configured such that a person may manipulate a mouse to move a cursor over an icon and do click the mouse to select the icon come or the icon corresponds to a name of the medium or a physical characteristic of the medium. The input information of the medium parameter is then stored for subsequent transmission to selector unit 130. Input 226 may include other input mechanisms such as a keyboard, microphone or other input device, to receive parameters which are requested from a person.

Memory 228 comprises a persistent storage device configured to store and retain instructions or code dredging the operation of controller 230. In some embodiments, memory 228 further includes a database or lookup table identifying physical characteristics of different media. In some embodiments, the database or look up table containing physical characteristics associate with different media names may be external to printing system 120, wherein printing system 120 communicates with the external database in a wired or wireless medication fashion.

Controller 230 comprises one or more processing units configured to generate control signal directing the operation of sensors 222, 224 as well or the requesting of parameter information through the display of input 226. Controller 230 further transmits one of more media parameters to selector unit 130 for use in varying application of a pretreatment composition. In circumstances where sensor 222 senses a physical characteristic of the medium or where the physical characters in the medium is input through input 226, controller 230 transmits the physical characteristic information or data directly to selector unit 130. In circumstances where sensor 224 determines a name or identity of the media or wherein the name or identity of the media is received through input 226, controller 230 may transmit the name or identity of the medium to selector unit 130 for use in choosing a pretreatment composition or varying application of the pretreatment composition by applicator 132. In embodiments where selector unit 130 utilizes the physical characteristics of the medium, but where the name of the medium is obtained (through sensor 224 or input 226), controller 230 consults a database or lookup table in memory 228 including physical characteristics associated with the identity of the media and then passes the physical characteristic to the selector unit 130 for use in choosing a pretreatment composition.

Pretreatment supply 128 comprises a supply of more than one pretreatment compositions and/or more than one pretreatment ingredients available for selection by selector unit 130 for supplying to pretreatment applicator 132. In the example illustrated, pretreatment supply 128 includes three different pretreatment compositions 146A, 146B and 146C (collectively referred with pretreatment compositions 146). In one embodiment, each of pretreatment compositions 146 has a different concentration or percentage of a fixing agent such as a polyvalent metal salt. In one embodiment, each of pretreatment compositions 146 has a different concentration or percentage of a latex resin. In one embodiment, each of pretreatment compositions may have a different concentration or percentage of a matte additive which reduces the reflectivity or gloss of the final printed upon image. In yet other embodiments, pretreatment compositions 146 and different concentrations of other ingredients or may include different ingredients altogether. In one embodiment, pretreatment compositions 146A, 146B and 146C comprise different pretreatment compositions configured to be applied to coated or uncoated print media having a gloss, semi-gloss and matte finish, respectively. Although supply 128 is illustrated as including three different pretreatment compositions 146, in other embodiments, supply 128 may include a greater or fewer of such different pretreatment compositions.

As shown by FIG. 3, pretreatment supply 128 additional includes pretreatment composition ingredients 148A, 148B and 148C (collectively referred to as pretreatment ingredients 48). Pretreatment ingredients 148 each comprise a portion of a final pretreatment composition to be applied by pretreatment applicator 132. Each pretreatment ingredients 148 includes one or more components or ingredients which, when mixed with other ingredients, forms the final pretreatment composition that is applied by pretreatment applicator 132. For example, in one embodiment, pretreatment ingredient 148A may comprise a liquid vehicle including multiple components or a single component which form the vehicle, pretreatment ingredient 148B may comprise a fixing agent, such as one of more polyvalent metal salts, and pretreatment ingredient 148C may comprise one of more latex resins. In one embodiment, pretreatment ingredient 148A may comprise a liquid carrier and a fixing agent, pretreatment ingredient 48B may comprise a latex resin and pretreatment ingredient 148C may comprise a matte additive which reduces the reflectivity or gloss of an image printed upon the final pretreatment composition. Ingredients 148 allow unit 130 to vary the mixture of such ingredients to vary the final pretreatment composition that is applied by pretreatment applicator 132. In one embodiment, one or more ingredients 148 may be added to the pre-mixed or pre-prepared pretreatment compositions 146 to vary the composition of the final pretreatment composition applied by pretreatment applicator 132. Although supply 128 is illustrated as including three different pretreatment ingredients, in other embodiment, supply 128 may include a greater or fewer of such pretreatment composition ingredients. In some embodiments, supply 128 may omit ingredients 148 or may alternatively omit the pre-mixed or pre-prepared compositions 146.

In the embodiment illustrated, supply 28 comprises a dock 234 including multiple bays 236, each bay 236 configured to removably receive a cartridge or container containing one of pretreatment compositions 146 or one of ingredients 148. In one embodiment, each bay 236 may have a distinct shape so as to receive mate and key with only a corresponding predetermined container containing a predetermined pretreatment composition are predetermined pretreatment composition ingredients. In other embodiments, supply 128 may include multiple chambers, each chamber configured to receive a pretreatment composition 146 which is poured into the chamber or an ingredient which is poured into the chamber. In other embodiments, supply 128 may have other configurations.

Selector unit 130 comprises a mechanism configured to select or identify a final pretreatment composition or application by pretreatment applicator 132 based at least in part upon one or more parameters obtained by unit 126. Once the selection is made, selector unit 130 facilitates the formation or creation of a final pretreatment composition on the medium. In the embodiment illustrated, selector unit is configured to form the final pretreatment composition by one of three selectable manners: (1) directing a selected preformulated composition 146, constituting the final pretreatment composition, to applicator 132 as indicated by arrow 243; (2) mixing pretreatment composition ingredients and/or compositions 146 to form a final pretreatment composition as indicated by arrows 244 and 245 and directing the mixed final pretreatment composition to applicator 132 as indicated by arrow 246; and (3) directing ingredients 148 and/or compositions 146 to applicator 132 without mixing or reacting, as indicated by arrows 243 and 248, wherein the ingredients 148 and/or composition(s) 146 mix or react on the applicator 132 itself or mix/react on the medium itself to form the final pretreatment composition. In other embodiments, selector unit 130 may be configured to form the final pretreatment composition on the medium with a fewer number of available alternative manners or in different manners. In the example illustrated, selector unit 130 comprises valve system 250, valve system 252, mixer 254, memory 256 and controller 258.

Valve system 250 comprises a mechanism configured to selectively connect and deliver one of pretreatment compositions 146 to applicator 132 in response to control signals from controller 258. Valve system 250 includes a plurality of actuatable valves and one of more actuators configured to actuate such valves between open and closed states or positions. In one embodiment, the actuators are configured to actuate such valves between a plurality of different partially open states to control or vary a rate at which the selected pretreatment composition 146 is provided to applicator 132.

In the example illustrated, valve system 250 is additionally configured to channel or direct a selected one of the pretreatment compositions 146 to mixer 254 instead of applicator 132. In such an embodiment, valve system 250 facilitates mixing of one or more pretreatment ingredients 148 with a selected pretreatment composition 146 prior to the final pretreatment composition, including the originally selected pretreatment composition 146 and the added ingredient 148, being supplied to applicator 132. In other embodiments, the ability to mix a selected pre-treatment composition 146 with one or more of ingredients 148 may be omitted.

Valve system 252 comprises a mechanism configured to selectively connect and deliver one or more of pretreatment composition ingredients 148 to mixer 254 in response to control signals from controller 258. Valve system 252 includes a plurality of actuatable valves and one of more actuators configured to actuate each of such valves between open and closed states or positions. In one embodiment, the actuators are configured to actuate each of such valves between a plurality of different partially open states such that a rate at which the selected pretreatment composition ingredients 148 is provided to mixer 254 may be controlled or the amount of each of such ingredients supplied to mixer 254 may be controlled. In one embodiment, digital operation of such valves may be utilized, whereby valve system delivers preset amounts of an ingredient for mixing or reacting and storage in mixer 254 prior to dispensing by applicator 132. Valve system 252 facilitates the delivery of different percentages or amounts of different pretreatment ingredients 148 to mixer 254 for preparing a custom final pretreatment composition based at least in part upon parameters obtained by unit 126.

Mixer 254 comprises at least a chamber connected to valve system 250 and valve system 252. Mixer 254 provides a body by which pretreatment composition ingredients 148 and possibly pretreatment compositions 146 may be mixed together to form a final pretreatment composition. In some embodiment, mixer 254 they include additional mechanisms for agitating, stirring or mixing the ingredients and compositions to be mixed. Mixer 254 includes a selectively openable and closable outlet connected to applicator 132. The outlet is configured to be actuated between the closed and open states in response to control signals from controller 258 when the selected or chosen components (ingredients 148 and composition 146) have been sufficiently mixed.

In embodiments where a pretreatment composition 146 is not to be mixed with ingredients 148, mixer 244 is not connected to valve system 250. In embodiments where supply 128 omits ingredients 148, valve system 252 and mixer 254 may be omitted. Likewise, in embodiments where pretreatment compositions 146 are omitted, valve system 250 may be omitted. As indicated by arrows 243 and 248, in embodiments where ingredients 148 and/or compositions 146 are mixed or react on the applicator itself or on the surface of the medium itself to form the final pretreatment composition, mixer 254 may be omitted, wherein valve systems 250 and 252 control the amounts and timing at which the compositions 146 and the ingredients 148 are provided, respectively, to the one or more applicators of applicator 132 for deposition onto the surface of the medium.

Memory 256 comprises a persistent storage device accessible by controller 258. In one embodiment, memory 256 may be part of an overall single memory including memory 228. Memory 256 stores written instructions, code or computer readable programs or instructions for controller 258. Memory 256 includes programs or algorithms for choosing or selecting pre-treatment composition 146 and one or more of pre-treatment ingredients 148 based upon parameters received from unit 126.

Controller 258 comprises one or more processing units configured to generate control signals according to instructions contained in memory 256 for directing the operation of valve systems 250, 252, mixer 254 and applicator 132. In one embodiment, controller 258 may comprise a module or portion of a larger controller including controller 230 and additional controllers controlling other components of printing system 120 such as fluid applicator 134 and finisher 136.

For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 258 may be embodied as part of one or more application-specific integrated circuits (ASICs). Unless otherwise specifically noted, the controller is not limited to any specific combination of hardware circuitry and software, nor to any particular source for the instructions executed by the processing unit.

Controller 258 identifies a final pretreatment composition comprising a single pretreatment composition 146, a combination of ingredients 148, a combination of composition 146 or a combination of one or more of compositions 146 and ingredients 148 based at least in part upon parameters of the medium being printed upon. In some embodiment, controller 258 may base the selection of a final pretreatment composition upon additional inputs are factors such as a desired ability of the final image. In one embodiment, controller 258 identifies a final pretreatment, system can be applied to applicator 132 by consulting a database or look up table contained in memory 256, wherein the database or look up table indicates different final pre-treatment compositions for different parameters. In another embodiment, controller 258 may identify a final pretreatment composition using algorithms or formulas. In some embodiments, controller 258 may additionally control more vary the density or coat weight of the final pre-treatment composition based at least in part upon the parameters from unit 126.

In the example illustrated, in response to receiving data indicating that the print medium has a higher level of reflectivity or gloss, controller 258 may select a pretreatment composition from the pre-prepared pretreatment compositions 146 or a final pretreatment composition to be prepared or mixed from ingredients 148 or from ingredients 148 and compositions 146 having little or no matte additive. In response to receiving data from unit 126 indicating that the print medium is uncoated or has a relatively small degree or amount of coating (greater pretreatment composition liquid carrier absorptivity), controller 258 may choose a pretreatment composition having a smaller quantity of fixer (polyvalent salt). Likewise, in response to receiving data from unit 126 indicating that the print medium is coated or has a relatively large degree or amount of coating (lesser pretreatment composition liquid carrier absorptivity), controller 258 may choose a pretreatment composition having a greater quantity of fixer (polyvalent salt). For example, when the medium to be printed upon comprises a coated offset media, controller 258 may choose a pretreatment composition having a concentration of between 1% and 20% by weight and nominally at least about 10% by weight of a polyvalent salt such as calcium chloride and cause applicator 32 to apply to pretreatment composition at a rate of 1 g per square meter. For uncoated media, controller unit 258 may generate control signals resulting in applicator 132 applying the same pretreatment composition at a rate of 0 to 1 g per square meter. In other embodiments, other pretreatment compositions and other coating weights may be selected.

In one embodiment, controller 258 may base its selection of a final pretreatment composition to be applied by pretreatment applicator 132 based upon parameters other than parameters of the media being printed upon. For example, in one embodiment, controller 258 may further base its selection of the final pretreatment composition on a desired durability of the image to be formed on the medium. In embodiments where a person or user indicates a need for a greater degree of durability for the image, controller 258 may a final pretreatment composition having a greater concentration or amount of a latex resin. Alternatively, where a person or user indicates a need for a lesser degree of durability or where other provisions are made for providing durability (such as with the finisher 136), controller 258 may choose a final pretreatment composition having a lesser concentration or amount of a latex resin. In place of a person indicating a desired durability level, the person may input the purpose of the printed media or the existence or other characteristics of any finishing or overcoat layers to be applied after formation of the image.

Pretreatment applicator 132 comprises one or more mechanisms or applicators configured to apply either the final pretreatment composition (one or more preformulated compositions 146 or a mixture of ingredients 148) chosen by selector unit 130 to the medium being carried by media transport 122 or to separately apply (sequentially or concurrently) the ingredients 148 and/or compositions 146 to the medium such that the ingredients 148 and/or compositions 146 mix or react on the surface of the medium to form the final pretreatment composition. The pretreatment applicator 132 receives the chosen final pretreatment composition or the selected ingredients (and the associated amounts) from selector unit 130. In one embodiment, pretreatment applicator 132 comprises a roller or roll coater. In embodiments where ingredients 148 and/or composition(s) 146 are separately applied and mixed or react with one another on the surface of the medium, applicator 132 may utilize a single roller to sequentially apply the ingredients 148 and/or compositions 146 or may include a plurality of rollers, each ingredient or subsets of ingredients and each composition 146 being applied by a designated one of the plurality of rollers. Because a roller or roll applicator is utilized to apply to pretreatment composition, the liquid carrier or water going on to the medium is reduced, enhancing properties of the medium and its media path. In one embodiment, the roll coater is configured to apply a final pretreatment composition having a concentration of between 1% and 20% by weight, and nominally at least 10% by weight, of a fixer, such as a polyvalent metal salt such as calcium chloride, covering the medium in a range of 0.3 to 20 g per square meter. In other embodiments, the roll coater of pretreatment applicator 132 may be configured to apply the final pretreatment composition chosen by selector unit 30 at other rates. In other embodiments, pretreatment applicator 132 may comprise other mechanisms or devices configured to apply the pretreatment composition chosen by selector unit 130 to the medium carried by media transport 122. For example, pretreatment applicator 132 may alternatively comprise one or more ink-jet device, such as one or more thermal inkjet or piezoelectric print heads.

In addition to forming a final pretreatment composition chosen by selector unit 130, pretreatment applicator 132 may be configured to apply the pretreatment compositions 146 and ingredients 148 at different rates, densities or coating weights as directed by selector unit 130 such that the final pretreatment composition formed on the medium has a selected and controlled coating weight or density. In particular, based upon the parameters of the medium being printed upon receipt from unit 126, selector unit 130 may generate control signals or otherwise caused pretreatment applicator 132 to apply the chosen pretreatment composition(s) and/or ingredients at different rates or in different amounts such that two different mediums may have the same final pretreatment compositions, but with different densities or different coating weights. For example, in certain applications, selector unit 130 may cause pretreatment applicator 132 to apply a heavier or lighter coating weight to the medium depending upon the parameters of the medium being printed upon.

Fluid applicator 134 comprises one or more mechanisms configured to apply fluid onto the medium after the final pretreatment composition has been applied to the medium by pretreatment applicator 132 but while the one or more pretreatment compositions are substantially wet. In one embodiment, fluid applicator 134 comprises ink-jet devices configured to supply one or more color planes of ink to the medium and on top of the previous applied pre-treatment composition while the pretreatment composition is wet. In one embodiment, fluid temperature 134 applies fluid, such as one more inks, to the medium in a range of 50 to 2000 ft./m. In other embodiments, fluid applicator 134 may comprise other mechanisms configured to apply ink or non-image forming fluids.

In the example illustrated, fluid applicator 134 and pretreatment applicator 132 are sufficiently close and media transport moves the medium between fluid applicator 132 and applicator 134 at a sufficient rate or speed such that the formation of film by the film forming particles of the pretreatment composition has not yet substantially begun. In one embodiment, the pretreatment composition is still substantially wet when fluid applicator 134 applies fluid to the medium. In one embodiment, at least 30% of the liquid or aqueous vehicle of the originally applied pretreatment composition remains on the surface of the medium when applicator 134 applies fluid on the pretreatment composition. As a result, the fluid from applicator 134 and the ink colorants adequately mix with the pretreatment composition and the colorants subsequently become trapped or encapsulated by the film that does subsequently form as more carrier is evaporated or absorbed. As noted above, encapsulation of the colorants by the film forms a durable image.

As shown by FIG. 1, printing system 120 may omit print zone dryers. The omission of print zone dryers is facilitated by the inclusion of fixing agents in the pretreatment composition. In particular, the final pretreatment composition chosen by selector unit 130 and applied by pretreatment applicator 132 fixes a colorant and controls bleeding without driving off carrier fluid between color planes applied by fluid applicator 34: In other embodiments, printing system 120 may include print zone dryers or other dryers.

Post print dryer 135 comprises one or more dryers configured to dry previously applied fluids on the print medium after the medium has moved out of any print zone opposite to fluid applicator 134. Such drying drives off, volatizes or evaporates the liquid vehicle, such as water and/or solvents. Such drying may be achieved by the application of heat, microwaves, convection and other drying mechanisms. In some embodiments, post print dryer 135 may be omitted.

Finisher 136 comprises a mechanism configured to apply an overcoat or finishing coat over the one more color planes or other fluids applied by fluid applicator 134 and over the previously applied to pretreatment composition applied by applicator 132. In one embodiment, finisher 136 may be configured to apply an anionic latex to enhance durability. In other embodiments, finisher 136 may be omitted.

Printing systems 20 and 120 choose a final pretreatment composition from a plurality of available different pretreatment compositions based upon parameters of the print medium. The chosen pretreatment composition (constituting a pre-treatment composition 46, 146, a combination of ingredients 48, 148 or a combination of a composition 46, 146 and one or more ingredients 48, 148) is used as a fixing fluid composition in a printing method. The "pre-treatment composition" contains an aqueous vehicle and an effective amount of one or more fixing agents. A fixing agent is an ingredient that initiates a change in the solubility or stability of the colorant and fixes the colorant in place in the printed image. An "effective amount" of fixing agents is an amount that is effective in achieving an improvement in print quality, e.g., decreased strikethrough and bleed, increased optical density (OD), chroma, edge acuity, as compared to a print that has not been treated with fixing agent. The pre-treatment composition can be formulated for high spread and quick penetration and drying. The surface tension can be less than about 45 mN/m.

Exemplary embodiments of the pre-treatment compositions comprise, as a fixing agent, a polyvalent metal salt. The polyvalent metal salt component can be a divalent or a higher polyvalent metallic ion and anion. In some embodiments, the polyvalent metal salt components are soluble in water. Examples of polyvalent metallic ions include divalent metallic ions, such as $Ca^{2+}$, $Cu^{2+}$, $Ni^{2+}$, $Mg^{2+}$, $Zn^{2+}$ and $Ba^{2+}$; trivalent metallic ions, such as $Al^{3+}$, $Fe^{3+}$ and $Cr^{3+}$. In some examples, the polyvalent metallic ion is selected from the group consisting of $Ca^{2+}$, $Mg^{2+}$ or $Zn^{2+}$. In some other examples, the polyvalent metallic ions are $Ca^{2+}$. Examples of anions include $Cl^-$, $I^-$, $Br^-$, $NO_3^-$ or $RCOO^-$ (where R is H or any hydrocarbon chain). In some embodiments, the polyvalent metal salt anion is a chloride ($Cl^-$) or acetate ($CH_3COO^-$). In some embodiments, the polyvalent metal salt is composed of divalent or polyvalent metallic ions and of nitrate or carboxylate ions. The carboxylate ions are derived from a saturated aliphatic monocarboxylic acid having 1 to 6 carbon atoms or a carbocyclic monocarboxylic acid having 7 to 11 carbon atoms. Examples of saturated aliphatic monocarboxylic acid having 1 to 6 carbon atoms include formic acid, acetic acid, propionic acid, butyric acid, isobutyric acid, valeric acid, isovaleric acid, pivalic acid and hexanoic acid.

In some embodiments, the fixing agent is a polyvalent metal salt selected from the group consisting of calcium chloride, calcium nitrate, magnesium nitrate, magnesium acetate or zinc acetate. In some other embodiments, the polyvalent metal salt is calcium chloride or calcium nitrate ($CaCl_2$ or $Ca(NO_3)_2$). In yet some other embodiments, the polyvalent metal salt is calcium chloride ($CaCl_2$).

In some examples, the fixing agent is present in the pre-treatment composition in an amount representing from about 1 to about 20 wt % of the total weight of the pre-treatment composition. In some other examples, the fixing agent is present in an amount representing from about 3 to about 15 wt % of the total weight of the pre-treatment composition. In yet some other examples, the fixing agent is present in an amount representing from about 5 to about 13 wt % of the total weight of the pre-treatment composition. In some other examples, the fixing agent is present in an amount representing from about 7 to about 9 wt % based on the total weight of the pre-treatment composition.

Exemplary embodiments of the pre-treatment composition comprise durability resins having film forming particles, such as latex resin components, which form a film over applied image forming colorants to provide improved water and smear fastness. In some examples, the polymeric latex is a cationic, an anionic or an amphoteric polymeric latex. In some other examples, the pre-treatment composition comprises an anionic latex resin component having low acid number. In some examples, the term latex refers herein to a group of preparations consisting of stable dispersions of polymeric micro-particles dispersed in an aqueous matrix. In some other examples, the latex resin components are present, in the composition, in the form of dispersed latex resin particles.

According to one exemplary embodiment, the latex resin has an acid number of less than 20. In some other embodiments, the latex resin has an acid number of less than 18. As used herein, the acid number (AN) refers to the acid number that has been measured by conductivity titration of the latent acid functions of the latex resin with nitric acid. As an example, the sample is made strongly basic with KOH then is titrated with 1% of $HNO_3$. The pH and conductivity curves are measured simultaneously.

In some examples, the latex resin is a resin made of polymer and copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers. In some other examples, the latex resin component is a latex containing particles of a vinyl acetate-based polymer, an acrylic polymer, a styrene polymer, an SBR-based polymer, a polyester-based polymer, a vinyl chloride-based polymer, or the like. In yet some other examples, the latex resin is a polymer or a copolymer selected from the group consisting of acrylic polymers, vinyl-acrylic copolymers and acrylic-polyurethane copolymers.

In some examples, the latex resin particles may have an average molecular weight (Mw) of 5,000 to 500,000. In some other examples, the latex resins have an average molecular weight (Mw) ranging from 150,000 to 300,000. In yet some other embodiments, the latex resins have an average molecular weight of about 250,000.

In some examples, the average particle diameter of the latex resin particles is from 10 nm to 1 μm and, as other examples, from 10 to 500 nm, and in yet other examples, from 50 nm to 250 nm. The particle size distribution of the latex is not particularly limited, and either latex having a broad particle size distribution or latex having a mono-dispersed particle size distribution may be used. It is also possible to use two or more kinds of polymer fine particles each having a mono-dispersed particle size distribution in combination.

In some examples, the glass transition temperature (Tg) of the resin latex ranges from −30° C. to 70° C. and, in some other examples, ranges from 0° C. to 50° C. In yet other examples, the glass transition temperature of the resin latex is below 40° C. In some examples, the glass transition temperature of the resin latex is below 30° C. The way of measuring the glass transition temperature (Tg) parameter is described in, for example, Polymer Handbook, 3rd Edition, authored by J. Brandrup, edited by E. H. Immergut, Wiley-Interscience, 1989.

In some embodiments, the latex resin of the present disclosure has an acid number of less than 20 and has a glass transition temperature that is below 40° C. In some other embodiments, the pre-treatment composition includes an anionic latex resin with an acid number below 20, with a glass transition temperature that is below 40° C. and with a molecular weight of approximately 250,000.

In some examples, the latex resin is present in the pre-treatment composition in an amount representing from about 1 to about 70 wt % of the total weight of the pre-treatment composition. In some other examples, the latex resin is present in an amount representing from about 10 to about 60 wt % of the total weight of the pre-treatment composition. In yet some other examples, the latex resin is present in an amount representing from about 20 to about 50 wt % of the total weight of the pre-treatment composition.

According to exemplary embodiments, the latex resin may include, but is in no way limited to latex resin sold under the name Hycar® or Vycar® (from Lubrizol Advanced Materials Inc.); Rhoplex® (from Rohm & Hass company); Neocar® (from Dow Chemical Comp); Aquacer® (fromBYC Inc) or Lucidene® (from Rohm & Haas company).

In some embodiments, the pre-treatment composition contains surfactants. Non-limiting examples of suitable surfactants include nonionic surfactant, cationic surfactant and combinations thereof. In some examples, the surfactants are nonionic surfactants. In some other examples, the surfactants are nonionic surfactants selected from the group consisting of nonionic fluorosurfactant, nonionic acetylenic diol surfactant, nonionic ethoxylated alcohol surfactant and combinations thereof. In a non-limitative example, the pre-treatment composition contains nonionic ethoxylated alcohol surfactant.

Several commercially available nonionic surfactants may be used in the formulation of the pre-treatment composition, examples of which include ethoxylated alcohols such as those from the Tergitol® series (e.g., Tergitol® 15S30, Tergitol® 15S9), manufactured by Dow Chemical; surfactants from the Surfynol® series (e.g. Surfynol® 440 and Surfynol® 465), manufactured by Air Products and Chemicals, Inc.; fluorinated surfactants, such as those from the Zonyl® family (e.g., Zonyl® FSO and Zonyl® FSN surfactants), manufactured by E.I. DuPont de Nemours and Company; fluorinated PolyFox® nonionic surfactants (e.g., PF159 nonionic surfactants), manufactured by Omnova; or combinations thereof. Suitable cationic surfactants that may be used in the pre-treatment composition include long chain amines and/or their salts, acrylated diamines, polyamines and/or their salts, quaternary ammonium salts, polyoxyethylenated long-chain amines, quaternized polyoxyethylenated long-chain amines, and/or combinations thereof.

In some embodiments, the surfactant is present in the pre-treatment composition in an amount up to about 1.5 weight percentage (wt %). As a non-limiting example, the surfactant is present in an amount ranging from about 0.1 wt % to about 1 wt %. In still another non-limiting example, the surfactant is present in an amount ranging from about 0.2 wt % to about 0.6 wt %.

In some embodiments, the pre-treatment composition comprises an aqueous vehicle. The term "aqueous vehicle," as defined herein, refers to the aqueous mix in which the fixing agent is placed to form the pre-treatment compositions. Examples of suitable aqueous vehicle components include, but are not limited to, water, co-solvents, surfactants, additives (corrosion inhibitors, salts, etc.), and/or combinations thereof. In some embodiments, the aqueous vehicle includes a water soluble organic co-solvent, a surfactant, and water. Non-limiting examples of the water soluble organic co-solvent include 2-ethyl-2-hydroxymethyl-1,3-propanediol, glycerol propoxylate, tripropylene glycol, 1-(2-hydroxyethyl)-2-pyrrolidinone, 1-(2-hydroxyethyl)-2-imidazolidinone, and/or combinations thereof. The previously listed solvents are suitable for any embodiments of the pre-treatment composition disclosed herein, particularly when using embodiments of the pre-treatment composition including amine-N-oxide and cationic polyelectrolytes. Other suitable solvents for embodiments of the pre-treatment composition includes at least the amine-N-oxide and the acid include ethylene glycol, diethylene glycol, triethylene glycol, 1-propoxy-2-propanol (commercially available as Dowanol® PNP from The Dow Chemical Co., Midland, Mich.), and combinations thereof. In some embodiments, the organic co-solvent is present in the pre-treatment compositions composition in an amount up to about 25 wt %. In a non-limiting example, the organic co-solvent ranges from about 0 wt % to about 20 wt %.

One or more additives may also be incorporated into any of the embodiments of the pre-treatment composition. As used herein, the term "additive" refers to a constituent of the fluid that operates to enhance performances, environmental effects, aesthetic effects, or other similar properties of the composition. Examples of suitable additives include biocides, sequestering agents, chelating agents, viscosity modifiers, anti-corrosion agents, optical whiteners and brighteners, marker dyes (e.g., visible, ultraviolet, infrared, fluorescent, etc.) and/or the like, and/or combinations thereof. The pre-treatment composition may also include a marker dye such as, for example, Basic Violet 16 (BV 16). In other embodiments, the additives are present in the pre-treatment composition in an amount ranging from about 0.01 wt % to about 1 wt %. In one example, about 0.05 wt % of the additive is present.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A printing system comprising:
a media transport configured to transport a medium;
a parameter obtaining unit configured to obtain at least one parameter of the medium;
a selector unit configured to select one or more of a plurality of pretreatment compositions to be formed on the medium based on the least one obtained parameter, wherein the at least one parameter comprises at least one of reflectivity and absorptivity;
one or more pretreatment applicators configured to form the selected one or more of the plurality of pretreatment compositions on the medium; and
a fluid applicator configured to apply fluid to the one or more pretreatment compositions on the medium to form one or more images.

2. The printing system of claim 1, wherein each of the plurality of pretreatment compositions comprise:
a liquid vehicle;
a polyvalent metal salt as a fixing agent; and
a latex resin having an acid number of less than 20.

3. The printing system of claim 1, wherein the fluid is anionic and wherein the least one pretreatment composition is anionic.

4. The printing system of claim 1, wherein the media transport is configured to move the medium from the pretreatment applicator to the fluid applicator in under five seconds.

5. The printing system of claim 1, wherein the system omits drying devices in a print zone of the fluid applicator.

6. The printing system of claim 1, wherein the pretreatment applicator is configured to apply the at least one pretreatment composition in a concentration of between 1% and 20% by weight of salt and between 1% and 70% by weight of resin covering the medium in a range of 0.3 to 20 gsm.

7. The printing system of claim 1, wherein the parameter obtaining unit comprises a medium characteristic detector.

8. The printing system of claim 1, wherein the parameter obtaining unit comprises an input configured to receive at least one characteristic of the medium or identity of the medium from a person.

9. The printing system of claim 1, wherein the parameter obtaining unit comprises:
a memory containing physical characteristics of a plurality of media;
a medium identifier configured to identify the medium and to obtain at least one physical characteristic of the medium from the memory based upon an identity of the medium.

10. The printing system of claim 1, further comprising an input device configured to receive an image durability selection, wherein the selector unit is configured to select the at least one of the plurality of pretreatment compositions based upon the received image durability selection.

11. The printing system of claim 1, wherein the selector unit is configured to select a first pretreatment composition having a first percentage of a matte fluid for a medium having a first gloss level and a second pretreatment composition having a second percentage of the matte fluid greater than the first percentage for a medium having a second gloss level less than the first gloss level.

12. The printing system of claim 1, wherein the selector unit prepares the selected one or more of the plurality of pretreatment compositions from pretreatment composition ingredients.

13. A printing system comprising:
a media transport configured to transport a medium;
a parameter obtaining unit configured to obtain at least one parameter of the medium;
a selector unit configured to select one or more of a plurality of pretreatment compositions to be formed on the medium based on the least one obtained parameter;
one or more pretreatment applicators configured to form the selected one or more of the plurality of pretreatment compositions on the medium; and
a fluid applicator configured to apply fluid to the one or more pretreatment compositions on the medium to form one or more images, wherein each of the plurality of pretreatment compositions comprise:
a liquid vehicle;
a polyvalent metal salt as a fixing agent; and
a latex resin having an acid number of less than 20.

14. A printing system comprising:
a media transport configured to transport a medium;
a parameter obtaining unit configured to obtain at least one parameter of the medium;
a selector unit configured to select one or more of a plurality of pretreatment compositions to be formed on the medium based on the least one obtained parameter;

one or more pretreatment applicators configured to form the selected one or more of the plurality of pretreatment compositions on the medium; and a fluid applicator configured to apply fluid to the one or more pretreatment compositions on the medium to form one or more images, wherein the fluid is anionic and wherein the least one pretreatment composition is anionic.

15. A printing system comprising:

a media transport configured to transport a medium;

a parameter obtaining unit configured to obtain at least one parameter of the medium;

a selector unit configured to select one or more of a plurality of pretreatment compositions to be formed on the medium based on the least one obtained parameter;

one or more pretreatment applicators configured to form the selected one or more of the plurality of pretreatment compositions on the medium; and a fluid applicator configured to apply fluid to the one or more pretreatment compositions on the medium to form one or more images, wherein the media transport is configured to move the medium from the pretreatment applicator to the fluid applicator in under five seconds.

16. A printing system comprising:

a media transport configured to transport a medium;

a parameter obtaining unit configured to obtain at least one parameter of the medium;

a selector unit configured to select one or more of a plurality of pretreatment compositions to be formed on the medium based on the least one obtained parameter;

one or more pretreatment applicators configured to form the selected one or more of the plurality of pretreatment compositions on the medium; and a fluid applicator configured to apply fluid to the one or more pretreatment compositions on the medium to form one or more images, wherein the pretreatment applicator is configured to apply the at least one pretreatment composition in a concentration of between 1% and 20% by weight of salt and between 1% and 70% by weight of resin covering the medium in a range of 0.3 to 20 gsm.

17. A printing system comprising:

a media transport configured to transport a medium;

a parameter obtaining unit configured to obtain at least one parameter of the medium;

a selector unit configured to select one or more of a plurality of pretreatment compositions to be formed on the medium based on the least one obtained parameter;

one or more pretreatment applicators configured to form the selected one or more of the plurality of pretreatment compositions on the medium; and a fluid applicator configured to apply fluid to the one or more pretreatment compositions on the medium to form one or more images, further comprising an input device configured to receive an image durability selection, wherein the selector unit is configured to select the at least one of the plurality of pretreatment compositions based upon the received image durability selection.

\* \* \* \* \*